(12) United States Patent
Endo

(10) Patent No.: US 10,728,437 B2
(45) Date of Patent: Jul. 28, 2020

(54) IMAGE CAPTURE CONTROL APPARATUS, IMAGE CAPTURE CONTROL METHOD, AND IMAGE CAPTURE CONTROL PROGRAM

(71) Applicant: CASIO COMPUTER CO., LTD., Shibuya-ku (JP)

(72) Inventor: Norio Endo, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 72 days.

(21) Appl. No.: 16/015,652

(22) Filed: Jun. 22, 2018

(65) Prior Publication Data
US 2018/0376050 A1 Dec. 27, 2018

(30) Foreign Application Priority Data

Jun. 26, 2017 (JP) .................... 2017-124624

(51) Int. Cl.
*H04N 5/225* (2006.01)
*H04N 5/232* (2006.01)
*H04N 5/76* (2006.01)
*G06F 3/01* (2006.01)
*H04N 5/04* (2006.01)
(Continued)

(52) U.S. Cl.
CPC ......... *H04N 5/23203* (2013.01); *G06F 3/011* (2013.01); *G06F 3/017* (2013.01);
(Continued)

(58) Field of Classification Search
CPC . H04N 7/188; H04N 5/23222; H04N 5/23219
See application file for complete search history.

(56) References Cited

U.S. PATENT DOCUMENTS 8,064,759 B1 * 11/2011 Kahn ................. H04N 5/23293
396/50
2004/0239776 A1 * 12/2004 Shinohara .............. H04N 5/232
348/239
(Continued)

FOREIGN PATENT DOCUMENTS

JP 2004-112054 4/2004
JP 2004-361708 12/2004
(Continued)

OTHER PUBLICATIONS

Notification of Reasons for Refusal dated Aug. 19, 2019 issued in Japanese Patent Application No. 2017-124624.

*Primary Examiner* — Twyler L Haskins
*Assistant Examiner* — Dwight Alex C Tejano
(74) *Attorney, Agent, or Firm* — Cozen O'Connor

(57) ABSTRACT

An image capture control apparatus includes a processor and a memory. The processor executes a program stored in the memory to perform operations including: detecting a manual image acquisition operation in which a user instructs the image capture control apparatus to capture or record an image to a storage unit according to an instruction; acquiring observation information relevant to a trigger for automatically acquiring image data on the basis of the detection of the manual image acquisition operation; setting a threshold value for automatically acquiring the image data on the basis of the observation information acquired by detecting the manual image acquisition operation; and performing control for automatically acquiring the image data on the basis of the threshold value of the observation information.

15 Claims, 11 Drawing Sheets

(51) Int. Cl.
*H04N 5/77* (2006.01)
*H04N 9/82* (2006.01)
*G06F 3/0346* (2013.01)
*G06N 3/08* (2006.01)
*G06N 20/00* (2019.01)

(52) U.S. Cl.
CPC ............. *G06F 3/0346* (2013.01); *G06N 3/08* (2013.01); *H04N 5/04* (2013.01); *H04N 5/232* (2013.01); *H04N 5/23206* (2013.01); *H04N 5/23222* (2013.01); *H04N 5/76* (2013.01); *H04N 5/77* (2013.01); *H04N 5/772* (2013.01); *H04N 9/8205* (2013.01); *G06N 20/00* (2019.01)

(56) References Cited

U.S. PATENT DOCUMENTS

| | | | | |
|---|---|---|---|---|
| 2007/0019094 | A1* | 1/2007 | Silberstein | H04N 1/0035 348/333.01 |
| 2008/0231714 | A1* | 9/2008 | Estevez | G03B 17/00 348/208.16 |
| 2009/0066803 | A1* | 3/2009 | Miyata | H04N 5/232 348/222.1 |
| 2013/0021487 | A1* | 1/2013 | Ishino | H04N 5/23222 348/220.1 |
| 2014/0204235 | A1* | 7/2014 | Wexler | H04N 5/23222 348/222.1 |
| 2015/0350536 | A1* | 12/2015 | Yajima | H04N 5/23219 348/158 |
| 2016/0127641 | A1* | 5/2016 | Gove | G06T 1/0007 348/143 |

FOREIGN PATENT DOCUMENTS

| | | |
|---|---|---|
| JP | 2007-213378 | 8/2007 |
| JP | 2009-071344 | 4/2009 |
| JP | 2010-068499 | 3/2010 |
| JP | 2010-146276 | 7/2010 |
| JP | 2016-072673 | 5/2016 |
| JP | 2016-213548 | 12/2016 |

\* cited by examiner

FIG. 2
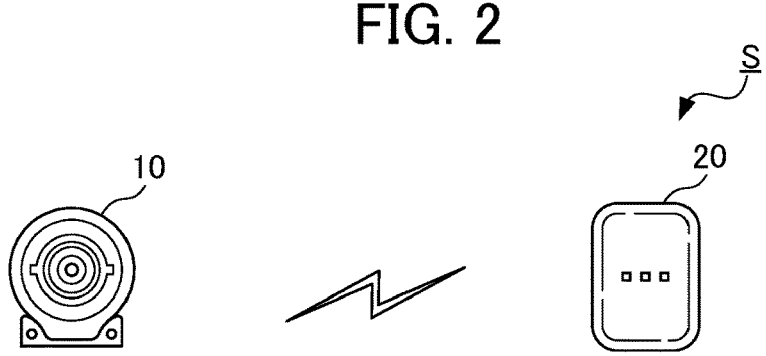
PERFORM TIME SYNCHRONIZATION AT TIME OF PERFORMING WIRELESS CONNECTION
CONSTANTLY MAINTAIN TIME SYNCHRONIZATION BY PERIODICALLY PERFORMING COMMUNICATION IN BOTH DIRECTIONS
<LEARNING PROCESSING>
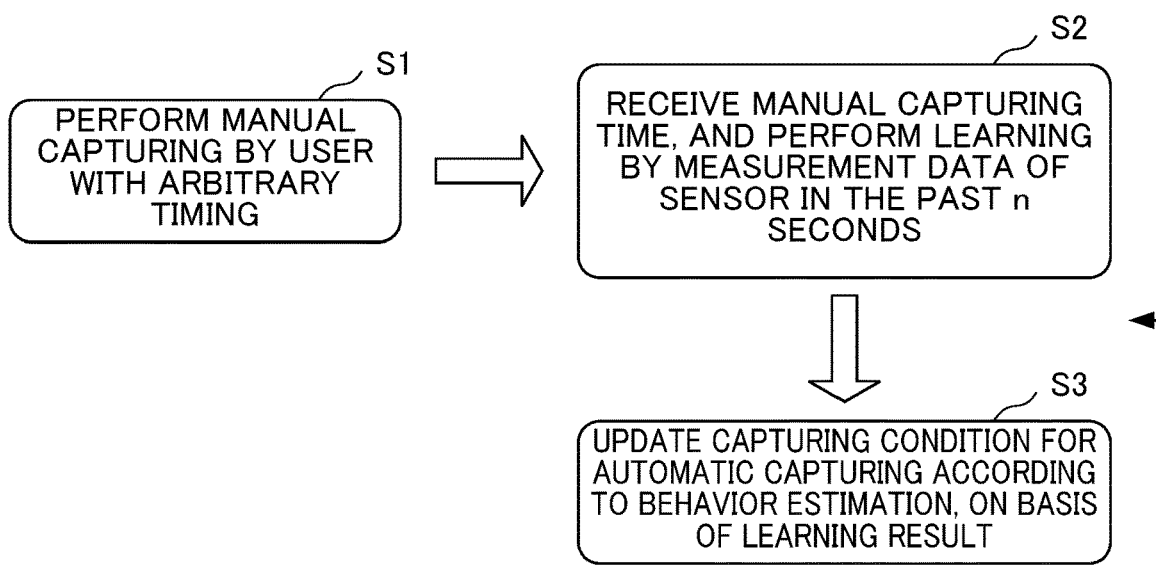
<BEHAVIOR ESTIMATION PROCESSING>
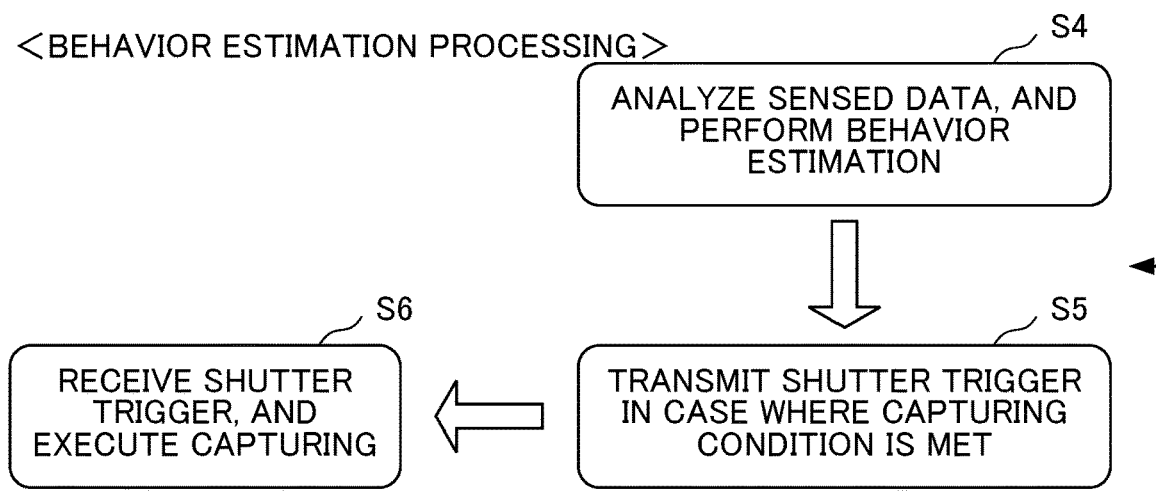

FIG. 9
<MODIFIED EXAMPLE1>
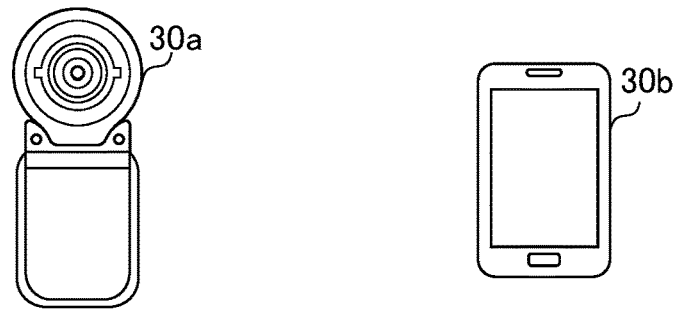
<MODIFIED EXAMPLE2>
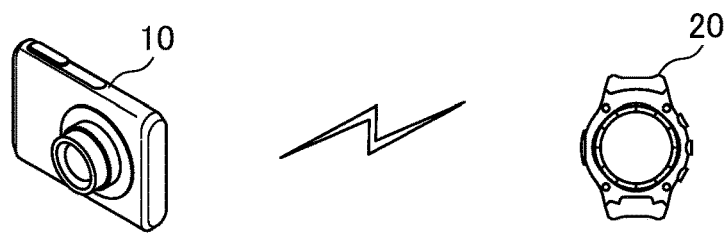
<MODIFIED EXAMPLE3>
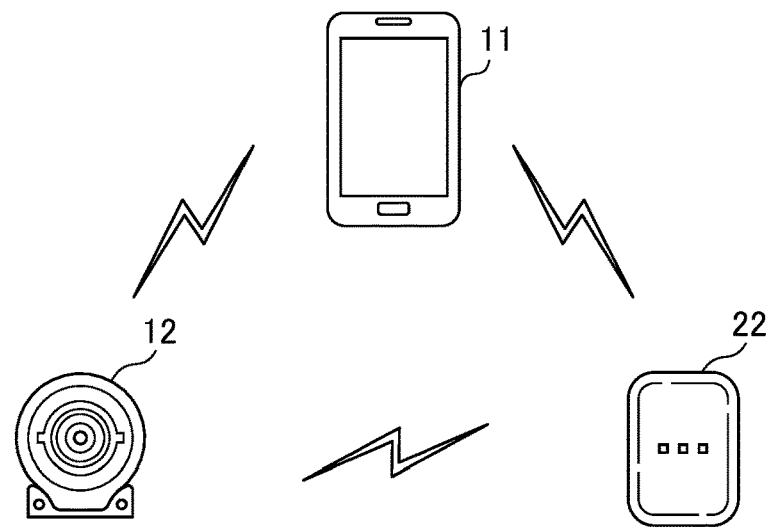

IMAGE CAPTURE CONTROL APPARATUS, IMAGE CAPTURE CONTROL METHOD, AND IMAGE CAPTURE CONTROL PROGRAM

CROSS-REFERENCE TO RELATED APPLICATIONS

This application is based upon and claims the benefit of priority under 35 USC 119 of Japanese Patent Application No. 2017-124624 filed on Jun. 26, 2017 the entire disclosure of which, including the description, claims, drawings, and abstract, is incorporated herein by reference in its entirety.

BACKGROUND OF THE INVENTION

Field of the Invention

The present invention relates to an image capture control apparatus, an image capture control method, and an image capture control program, for performing control relevant to capturing.

Related Art

Conventionally, an imaging device automatically performing capturing on the basis of various sensor information items, is known as an imaging device. For example, in JP 2016-072673 A, it is disclosed that a sensor unit is provided in a portable device which is contained in a housing which is different from a housing of an image capture unit, and is connected to the image capture unit in a wireless manner, and an imaging timing of the image capture unit is automatically controlled according to a measurement result which is measured by the sensor unit.

SUMMARY OF THE INVENTION

According to an aspect of the present invention, an image capture control apparatus including a processor and a memory, wherein the processor executes a program stored in the memory to perform operations including: detecting a manual image acquisition operation in which a user instructs the image capture control apparatus to capture or record an image to a storage unit according to the instruction; acquiring observation information relevant to a trigger for automatically acquiring image data on the basis of the detection of the manual image acquisition operation; setting a threshold value for automatically acquiring the image data on the basis of the observation information acquired by detecting the manual image acquisition operation; and performing control for automatically acquiring the image data on the basis of the threshold value of the observation information.

According to another aspect of the present invention, an image capture control method is executed by an image capture control apparatus including a processor, and the image capture control method causes the processor to execute a program stored in a memory to perform operations including: detecting a manual image acquisition operation in which a user instructs the image capture control apparatus to capture or record an image to a storage unit according to the instruction; acquiring observation information relevant to a trigger for automatically acquiring image data on the basis of the detection of the manual image acquisition operation; setting a threshold value for automatically acquiring the image data on the basis of the observation information acquired by detecting the manual image acquisition opera- tion; and performing control for automatically acquiring the image data on the basis of the threshold value of the observation information.

According to still another aspect of the present invention, a non-transitory computer-readable storage medium stores a program that is executable by a computer that includes a processor to control an image capture control apparatus. The program is executable to cause the computer to perform operations including: detecting a manual image acquisition operation in which a user instructs the image capture control apparatus to capture or record an image to a storage unit according to the instruction; acquiring observation information relevant to a trigger for automatically acquiring image data on the basis of the detection of the manual image acquisition operation; setting a threshold value for automatically acquiring the image data on the basis of the observation information acquired by detecting the manual image acquisition operation; and performing control for automatically acquiring the image data on the basis of the threshold value of the observation information.

BRIEF DESCRIPTION OF THE DRAWINGS

FIG. 2 is a transition diagram illustrating an outline of processing of the automatic capturing system according to the embodiment of the present invention.

FIG. 9 is a system configuration diagram illustrating a system configuration of Modified Example 1 to Modified Example 3 of the embodiment of the present invention.

DETAILED DESCRIPTION OF THE INVENTION

Hereinafter, an embodiment of the present invention will be described by using the drawings.

[System Configuration]

Figure 1:
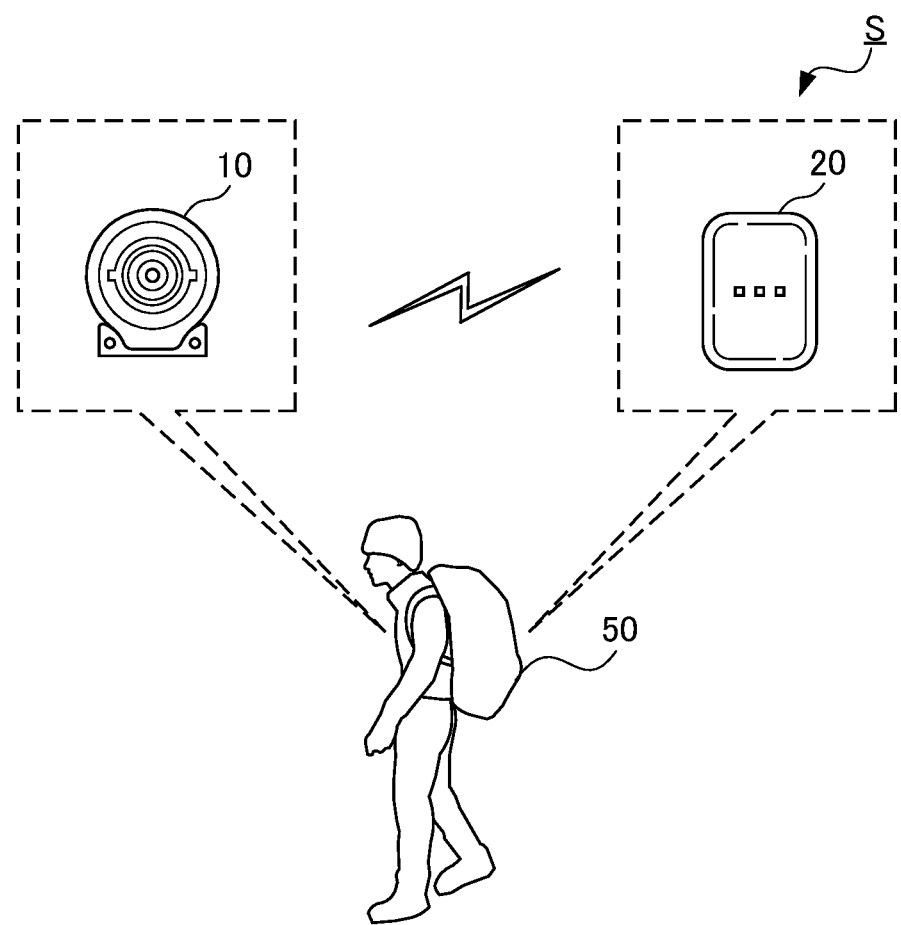
FIG. 1 is a system configuration diagram illustrating a configuration of an automatic capturing system according to an embodiment of the present invention.

FIG. 1 is a system configuration diagram illustrating a configuration of an automatic capturing system S according to one embodiment of the present invention. As illustrated in FIG. 1, the automatic capturing system S includes an imaging device 10 and a control apparatus 20. Each of the imaging device 10 and the control apparatus 20, for example, is used by a user 50 who is a user of the automatic capturing system S.

The imaging device 10 is realized by a camera which is capable of performing automatic capturing, and for example, is used by being worn by the user 50. For example, the imaging device 10 is used by being mounted in a position where a lens of the image capture unit is directed towards a subject which is a capturing target.

The control apparatus 20 is realized by a wearable terminal including a sensor for measuring the motion of the user 50, and is used by being worn by the user 50. For example, the control apparatus 20 is used by being mounted on the waist of the user 50 in order to measure the motion of the trunk of the user 50.

The imaging device 10 and the control apparatus 20 are connected to communicate with each other. The communication between the imaging device 10 and the control apparatus 20, for example, is realized by communication based on Bluetooth (Registered Trademark) low energy (hereinafter, referred to as "BLE") or communication based on wireless fidelity (Wi-Fi).

In the automatic capturing system S, automatic capturing is performed in association with an operation of the user 50. For this reason, the automatic capturing system S sets a "trigger operation". Then, the automatic capturing system S performs the automatic capturing in a case where the trigger operation is detected in the operation of the user 50. Thus, in this embodiment, the automatic capturing is executed on the basis of the trigger operation set in association with the operation of the user 50. Accordingly, in this embodiment, the automatic capturing can be performed in a condition suitable for the user.

[State Transition]

The automatic capturing in the automatic capturing system S will be further described with reference to a state transition diagram of FIG. 2. Furthermore, the user 50 is illustrated in FIG. 1, and herein, the "user 50" is described in the above description, but in the following description, the reference numeral will be omitted, and the "user 50" will be simply referred to as a "user".

The imaging device 10 and the control apparatus 20 perform time synchronization at the time of performing wireless connection, under assumption of performing the automatic capturing. In addition, the imaging device 10 and the control apparatus 20 periodically communicate time information with each other in both directions, and thus, constantly maintain the time synchronization. In this case, the imaging device 10 and the control apparatus 20, for example, perform the time synchronization on the basis of the simple network time protocol (SNTP).

In this embodiment, processing performed by the imaging device 10 and the control apparatus 20 is grouped into two pieces of processing of "learning processing" and "behavior estimation processing". Here, in the learning processing, "information for detecting a trigger operation" which is information for detecting the trigger operation is learned. In addition, in the behavior estimation processing, the trigger operation is detected by using the learned information for detecting a trigger operation, and the automatic capturing is performed by using the detection of the trigger operation as an opportunity. Hereinafter, each of two pieces of processing will be described. Furthermore, it is not necessary that such two pieces of processing are alternately performed, and one processing is continuously performed, and then, the other processing is performed.

First, the learning processing for learning the information for detecting a trigger operation will be described. In state S1, the user performs a predetermined operation at an arbitrary timing and a shutter manipulation of the imaging device 10. The predetermined operation is not particularly limited, and for example, may be an operation of moving any one arm according to a determined motion, jumping, or the like. The shutter manipulation, for example, is performed by pressing a shutter button provided in the imaging device 10, manually (in a manual manipulation). The imaging device 10 receiving the shutter manipulation, executes manual capturing. In a case where the manual capturing is performed, the state transitions to state S2.

In state S2, the imaging device 10 transmits manual capturing time which is time when the manual capturing is executed, to the control apparatus 20. The control apparatus 20 learns information for detecting a trigger on the basis of measurement data of the sensor for n seconds, which is measured before n seconds of the manual capturing time (n is an arbitrary positive value) until the manual capturing time. In a case where learning is ended, the state transitions to state S3.

In state S3, the control apparatus 20 updates the information for detecting a trigger operation on the basis of a learning result. Accordingly, the learning processing is ended. The imaging device 10 and the control apparatus 20 perform such learning processing whenever the manual capturing is executed by the user. Accordingly, the information for detecting a trigger operation is repeatedly updated, and thus, it is possible to increase a detection accuracy of the trigger operation.

Next, the behavior estimation processing will be described. In state S4, the control apparatus 20 performs behavior estimation. Specifically, the control apparatus 20 analyzes the measurement data of the sensor. Then, the control apparatus 20 determines whether or not the trigger operation is detected, on the basis of the analyzed measurement data, and the information for detecting a trigger operation. That is, the behavior estimation of whether or not the user 50 performs the trigger operation is performed. In a case where the behavior estimation is performed, the state transitions to state S5.

In state S5, in a case where the trigger operation is detected, the control apparatus 20 generates a shutter trigger which is a capturing execution instruction. Then, the control apparatus 20 transmits the generated shutter trigger to the imaging device 10. In a case where the shutter trigger is transmitted, the state transitions to state S6.

In state S6, the imaging device 10 receives the shutter trigger, and executes the automatic capturing by using the reception of the shutter trigger as an opportunity.

According to the learning processing and the behavior estimation processing as described above, the automatic capturing system S executes the automatic capturing in association with the operation of the user. Accordingly, according to the automatic capturing system S, it is possible to perform the automatic capturing in a condition suitable for the user.

[Hardware Configuration]

Figure 3:
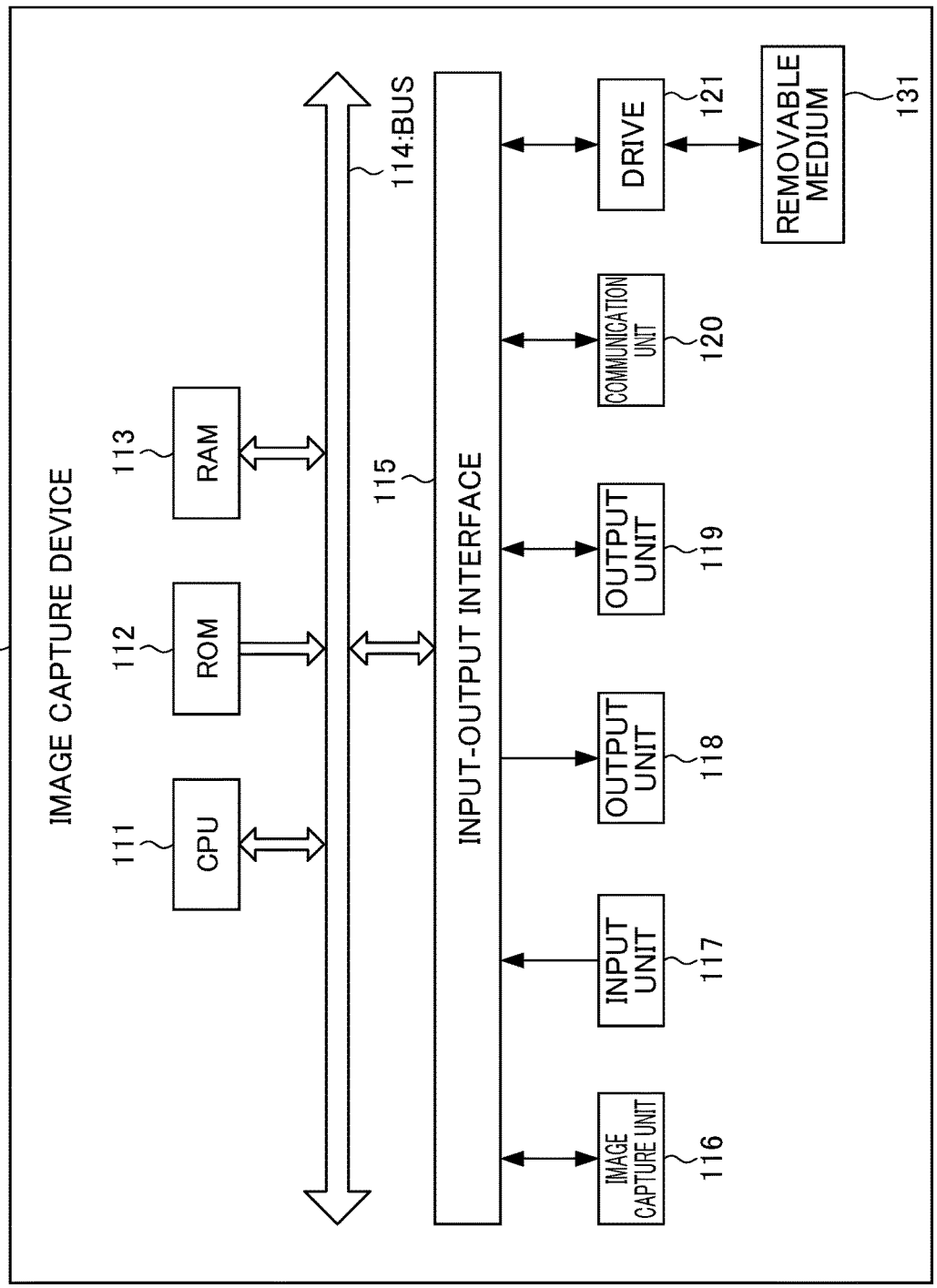
FIG. 3 is a block diagram illustrating a hardware configuration of an imaging device according to the embodiment of the present invention.

Next, a hardware configuration of the imaging device 10 and the control apparatus 20 will be described, with reference to FIG. 3 and FIG. 4. FIG. 3 is a block diagram illustrating the hardware configuration of the imaging device 10. The imaging device 10 includes an image capturing function, and for example, is configured of a digital camera. The control apparatus 20 may be realized by one housing, and for example, may be realized by an individual housing such as a housing in which a display is unitized, and a housing in which a capturing function is unitized.

As illustrated in FIG. 3, the imaging device 10 includes a central processing unit (CPU) 111, a read only memory (ROM) 112, a random access memory (RAM) 113, a bus 114, an input-output interface 115, an image capture unit 116, an input unit 117, an output unit 118, a storage unit 119, a communication unit 120, and a drive 121.

The CPU 111 executes various kinds of processing according to a program which is recorded in the ROM 112, or a program which is loaded on the RAM 113 from the storage unit 119.

In the RAM 113, data or the like which is necessary for the CPU 111 to execute various kinds of processing, is suitably stored.

The CPU 111, the ROM 112, and the RAM 113 are connected to each other through the bus 114. In addition, the input-output interface 115 is also connected to the bus 114. The image capture unit 116, the input unit 117, the output unit 118, the storage unit 119, the communication unit 120, and the drive 121 are connected to the input-output interface 115.

Even though it is not illustrated, the image capture unit 116 includes an optical lens unit and an image sensor.

The optical lens unit is configured of a lens condensing light in order to capture the subject, such as a focus lens or a zoom lens. The focus lens is a lens forming a subject image on a light receiving surface of the image sensor. The zoom lens is a lens freely changing a focal distance in a certain range. In addition, as necessary, a peripheral circuit adjusting a setting parameter such as a focal point, exposure, and a white balance, is provided in the optical lens unit.

The image sensor is configured of a photoelectric conversion element, an analog front end (AFE), or the like. The photoelectric conversion element, for example, is configured of a complementary metal oxide semiconductor (CMOS) type photoelectric conversion element or the like. The subject image is incident on the photoelectric conversion element from the optical lens unit. Therefore, the photoelectric conversion element performs photoelectric conversion (imaging) with respect to the subject image, accumulates an image signal for a certain period of time, and sequentially supplies the accumulated image signal to the AFE, as an analog signal. The AFE executes various kinds of signal processing such as analog/digital (A/D) conversion processing, with respect to the analog image signal. According to various kinds of signal processing, a digital signal is generated, and is output as an output signal of the image capture unit 116. Such an output signal of the image capture unit 116 is suitably supplied to a CPU 211 or the like.

The input unit 117 is configured of various buttons such as a shutter button, a touch panel, or the like, and inputs various information items according to an instruction manipulation of the user. The output unit 118 is configured of a display, a speaker, a lamp, or the like, and outputs an image, a sound, light, or the like. The storage unit 119 is configured of a semiconductor memory such as a dynamic random access memory (DRAM), and stores various data items.

The communication unit 120 controls communication with respect to the other device. In this embodiment, the communication unit 120, for example, communicates with the control apparatus 20 on the basis of a standard such as BLE (Registered Trademark), an ad hoc mode in Wi-Fi, and a standard such as Wi-Fi Direct. Furthermore, communication may be performed by direct wireless communication between devices, or may be performed through a network such as the Internet, or a relay device.

A removable medium 131 formed of a magnetic disk, an optical disk, a magnetooptic disk, a semiconductor memory, or the like, is suitably mounted on the drive 121. A program or various data items read out by the drive 121 from the removable medium 131 are installed in a storage unit 219, as necessary. In addition, the removable medium 131 is also capable of storing various data items such as image data stored in the storage unit 219, as with the storage unit 219.

Figure 4:
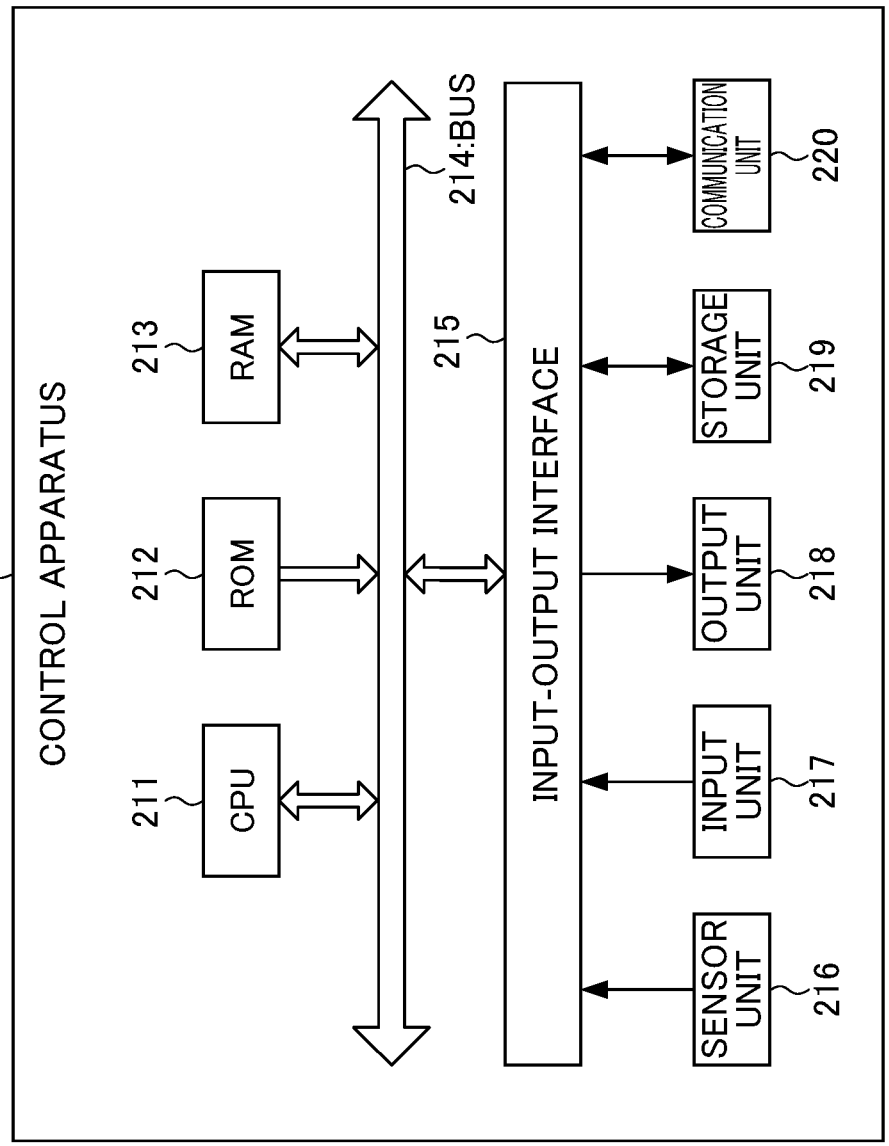
FIG. 4 is a block diagram illustrating a hardware configuration of a control apparatus according to the embodiment of the present invention.

FIG. 4 is a block diagram illustrating the hardware configuration of the control apparatus 20. The control apparatus 20 is configured as a device including various sensors detecting the motion of the user, who is a measurement target. As illustrated in FIG. 4, the control apparatus 20 includes the CPU 211, a ROM 212, a RAM 213, a bus 214, an input-output interface 215, a sensor unit 216, an input unit 217, an output unit 218, a storage unit 219, and a communication unit 220. Among them, the configurations other than the sensor unit 216 are identical to those of each of the portions with the same names of the imaging device 10 described with reference to FIG. 3. Furthermore, as with the drive 121 of the imaging device 10 described with reference to FIG. 3, a drive which is capable of mounting a removable medium such as a semiconductor memory, may be provided in the control apparatus 20.

The sensor unit 216 includes at least a motion sensor for measuring a physical amount which is changed according to the motion of the user. Examples of the motion sensor include a three-axis acceleration rate sensor measuring an acceleration rate in a three-axis direction, a three-axis angular rate sensor measuring an angular rate in the three-axis direction, and a three-axis geomagnetic sensor measuring geomagnetism in the three-axis direction. The sensor unit 216 measures the acceleration rate, the angular rate, and the geomagnetism in the three-axis direction, by the three-axis acceleration rate sensor, the three-axis angular rate sensor, and the three-axis geomagnetic sensor, for each sampling period set in advance (for example, 0.001 seconds). The data of the acceleration rate, the angular rate, and the geomagnetism, measured by the sensor unit 216, is stored in the storage unit 219 or is output to the CPU 311, in association with data of measurement time. Furthermore, the sensor unit 216, for example, may include a sensor for measuring an environmental condition, such as an atmospheric pressure sensor, an ultraviolet sensor, a temperature sensor, and a humidity sensor. Further, the sensor unit 216 may include a positioning sensor such as a global positioning system (GPS).

[Functional Configuration]

Figure 5:
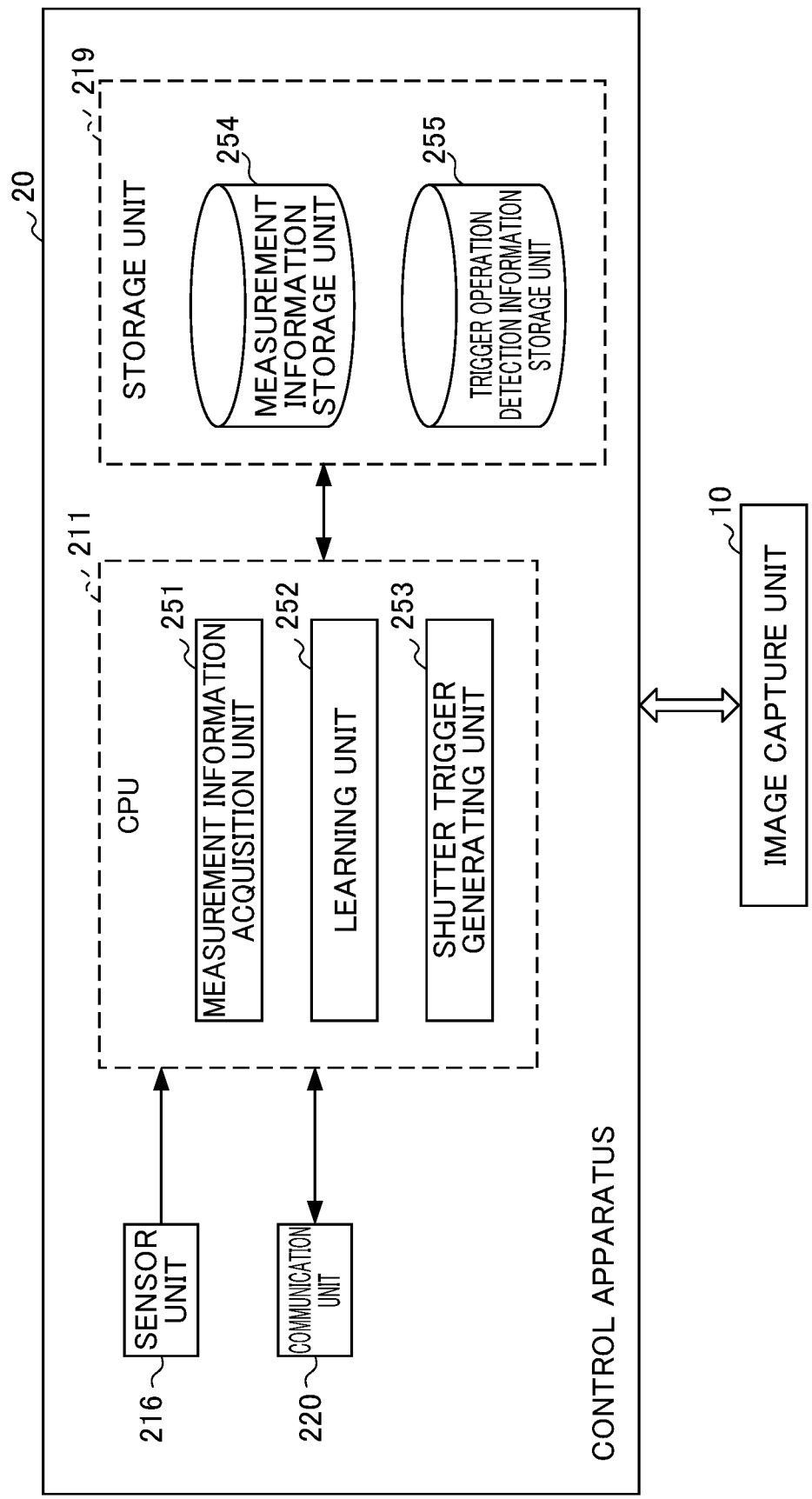
FIG. 5 is a functional block diagram illustrating a functional configuration for executing behavior estimation processing and learning processing, in a functional configuration of the control apparatus according to the embodiment of the present invention.

Next, the functional configuration of the control apparatus 20 will be described with reference to FIG. 5. FIG. 5 is a functional block diagram illustrating a functional configuration for executing the learning processing and the behavior estimation processing, in the functional configuration of the imaging device 10. The learning processing and the behavior estimation processing are the processing described above with reference to FIG. 2.

In a case where the learning processing and the behavior estimation processing are executed, as illustrated in FIG. 5, in the CPU 211, a measurement information acquisition unit 251, a learning unit 252, and a shutter trigger generating unit 253 function. In addition, a measurement information storage unit 254 and a trigger operation detection information storage unit 255 are set in one region of the storage unit 219.

The measurement information acquisition unit 251 is a portion acquiring a measurement value which is measured by each of the sensors included in the sensor unit 216. For example, a combination between measurement values of the acceleration rate, the angular rate, and the geomagnetism, and measurement time of each of the measurement values, is used as the measurement value. The measurement information acquisition unit 251 stores the acquired measurement value in the measurement information storage unit 254. Furthermore, in a case where the measurement value is stored in the measurement information storage unit 254, the measurement information acquisition unit 251 performs smoothing with respect to the data of the measurement value in order to prevent a variation in the data. Specifically, each of output signals of various sensors is filtered, and thus, an influence of a noise is suppressed.

The learning unit 252 is a portion performing learning with respect to the information for detecting a trigger operation, on the basis of the measurement value which is measured by each of the sensors included in the sensor unit 216. Specifically, the learning unit 252 receives the manual capturing time which is time when the manual capturing is executed, from the imaging device 10. Then, the learning unit 252 reads out the measurement value for n seconds before n seconds of the manual capturing time until the manual capturing time, from the measurement information storage unit 254. Next, the learning unit 252 performs learning with respect to the information for detecting a trigger operation, on the basis of the measurement value for n seconds.

Learning with respect to the information for detecting a trigger operation can be performed by various methods. For example, the learning unit 252 learns a waveform indicating a fluctuation in the measurement value for n seconds, as the trigger operation. In this case, not only is the waveform simply learned, but also a characteristic portion of the waveform may be learned as the information for detecting a trigger operation. For this reason, the learning unit 252, for example, performs learning whenever the manual capturing is performed, and thus, generates a plurality of waveforms of the measurement value for n seconds corresponding to each of a plurality of times of the manual capturing. Then, the learning unit 252 compares the plurality of waveforms, and thus, learns the characteristic portion common in each of the waveforms, as the information for detecting a trigger operation. Then, the learning unit 252 stores the learned information for detecting a trigger operation in the operation detection information storage unit 255. Furthermore, the information for detecting an operation, for example, is a threshold value indicating the learned waveform or the learned characteristic portion of the waveform.

In addition, the learning unit 252 may perform machine learning as learning. In this case, the learning unit 252, for example, performs supervised learning by a neural network which is configured by being combined with a perceptron. For this reason, the learning unit 252 extracts a feature amount from the measurement value for n seconds. For example, the learning unit 252 extracts a size of a synthetic acceleration rate measured for n seconds, a movement amount in a horizontal direction, or the like, as the feature amount. In addition, the learning unit 252 sets the fact that the manual capturing is performed, as a label indicating a correct answer in the supervised learning.

Then, the learning unit 252 applies a set of the feature amount and the label to the neural network, as teacher data, and repeats learning while changing weighing with respect to each of the perceptrons such that the output of the neural network is identical to the label. Thus, the learning unit 252 learns the characteristics of the teacher data, and inductively obtains a learning model for estimating a result from input. Then, the learning unit 252 stores the learning model in the trigger operation detection information storage unit 255, as the information for detecting a trigger operation.

The shutter trigger generating unit 253 performs the behavior estimation of whether or not the trigger operation is detected, on the basis of the measurement value which is measured by each of the sensors included in the sensor unit 216, and the information for detecting a trigger operation which is stored in the trigger operation detection information storage unit 255.

For example, in a case where the learning unit 252 learns the threshold value indicating the characteristic portion common in each of the waveforms, as the information for detecting a trigger operation, the shutter trigger generating unit 253 compares the measurement value which is measured by each of the sensors included in the sensor unit 216, with the threshold value which is the information for detecting a trigger operation. Then, for example, in a case where the measurement value is greater than the threshold value, the shutter trigger generating unit 253 determines that the trigger operation is detected.

In addition, for example, in a case where the learning unit 252 learns the learning model of the machine learning, as the operation detection information, the shutter trigger generating unit 253 sets the feature amount of the measurement value which is measured by each of the sensors included in the sensor unit 216 as the input of the learning model. Then, the shutter trigger generating unit 253 determines that the trigger operation is detected, on the basis of the output of the learning model. For example, in a case where the output of the learning model is greater than the threshold value indicating a case where the trigger operation is detected, it is determined that the trigger operation is detected.

Then, in a case where the trigger operation is detected as a result of the behavior estimation, the shutter trigger generating unit 253 generates the shutter trigger for performing the automatic capturing. Then, the shutter trigger generating unit 253 transmits the generated shutter trigger to the imaging device 10 through the communication unit 220.

According to the functional block, the control apparatus 20 performs the behavior estimation on the basis of the measurement value of the sensor, and the information for detecting a trigger operation, and performs the automatic capturing in a case where the trigger operation of the user is detected.

[Operation]

Figure 6:
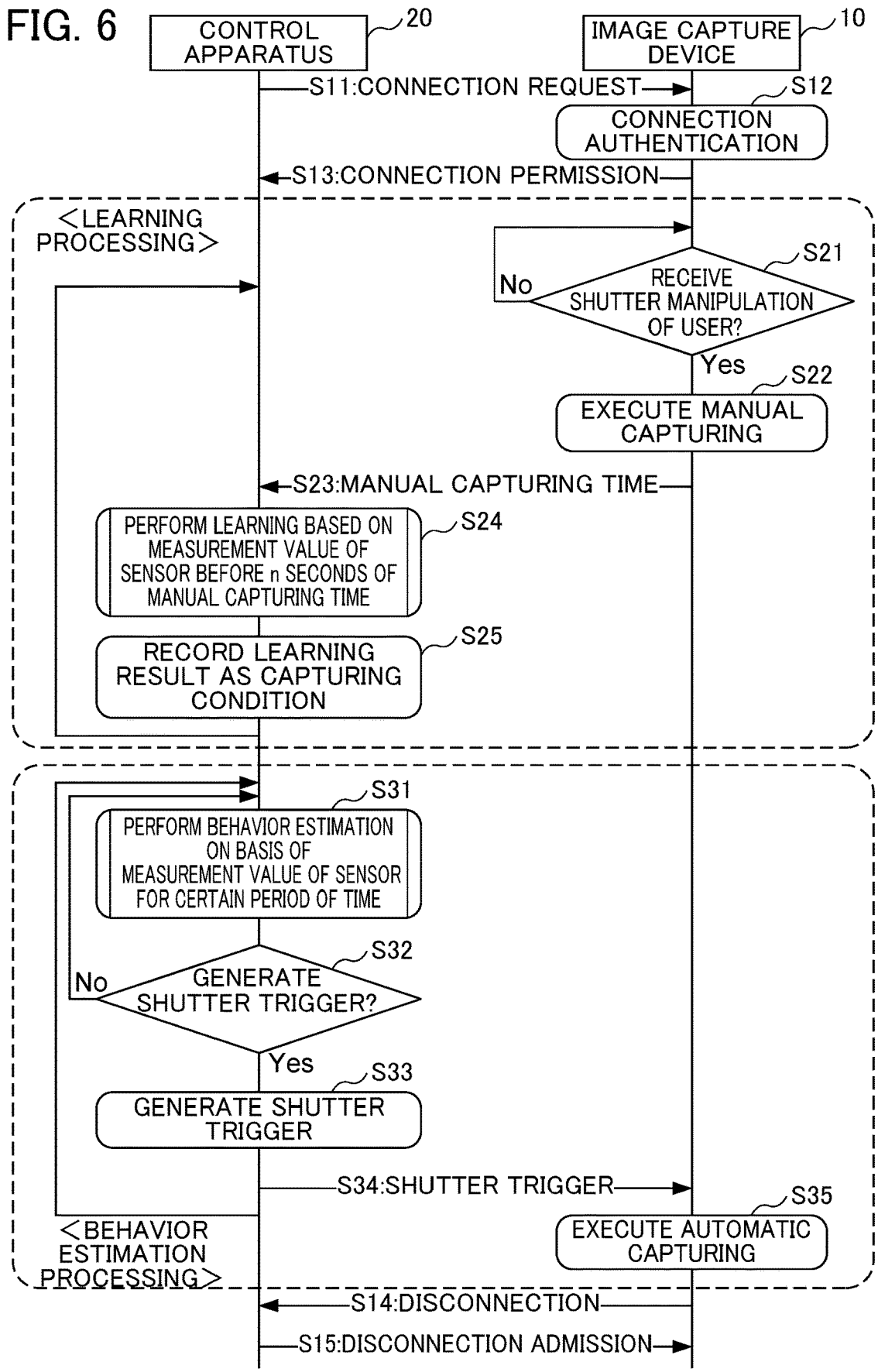
FIG. 6 is a sequence diagram illustrating an operation at the time of performing the behavior estimation processing and the learning processing of the control apparatus and the imaging device according to the embodiment of the present invention.

Next, an operation of the automatic capturing system S will be described. FIG. 6 is a sequence diagram illustrating operations of the imaging device 10 and the control apparatus 20 in the automatic capturing system S.

In step S11, the control apparatus 20 transmits a connection request for establishing connection with respect to the imaging device 10. In step S12, the imaging device 10 receives the connection request from the control apparatus 20, and performs connection authentication processing. In step S13, the imaging device 10 transmits connection permission to the control apparatus 20. According to the processing described above, communication connection between the imaging device 10 and the control apparatus 20 is established. Furthermore, the processing from step S11 to step S13 is performed on the basis of a communication standard, and is well known to a person skilled in the art, and thus, the detailed description thereof will be omitted.

Next, the learning processing and the behavior estimation processing are performed. Here, as described above with reference to FIG. 2, it is not necessary that such two pieces of processing are alternately performed, and one processing is continuously performed, and then, the other processing is performed.

First, the learning processing will be described. In step S21, the imaging device 10 determines whether or not the shutter manipulation from the user is received. In a case where the shutter manipulation is not received from the user, it is determined as No in step S21, and the determination is repeated. On the other hand, in a case where the shutter manipulation is received from the user, it is determined as Yes in step S21, the processing proceeds to step S22.

In step S22, the imaging device 10 executes the manual capturing. In step S23, the imaging device 10 transmits the manual capturing time to the control apparatus 20. In step S24, the imaging device 10 performs learning on the basis of the measurement value of the sensor for n seconds before n seconds at the time of performing the manual capturing until the manual capturing time. Furthermore, a more detailed operation of step S24 will be described below with reference to FIG. 7.

In step S25, the imaging device 10 records the information for detecting a trigger operation, on the basis of the learning result.

Next, the behavior estimation processing will be described. In step S31, the control apparatus 20 performs the behavior estimation by using the measurement value of the sensor for a certain period of time, and the information for detecting a trigger operation. Furthermore, a more detailed operation of step S31 will be described below with reference to FIG. 8.

In step S32, the control apparatus 20 determines whether or not the shutter trigger is generated. In the behavior estimation of step S31, in a case where the trigger operation is not detected, it is determined as No in step S32, and the processing proceeds again to step S31. On the other hand, in the behavior estimation of step S31, in a case where the trigger operation is detected, it is determined as Yes in step S32, and the processing proceeds again to step S33.

In step S33, the control apparatus 20 generates the shutter trigger. In step S34, the control apparatus 20 transmits the generated shutter trigger to the imaging device 10.

In step S35, the imaging device 10 executes the automatic capturing by using the reception of the shutter trigger as an opportunity. The learning processing and the behavior estimation processing described above are repeatedly performed. Then, in a case where such processing is ended according to the manipulation or the like of the user, in step S14, a disconnection request is transmitted from the imaging device 10 to the control apparatus 20.

In step S15, a response of disconnection admission is transmitted from the control apparatus 20 to the imaging device 10. Accordingly, this processing is ended.

Next, the operation of step S24 of FIG. 6 will be described in more detail, with reference to FIG. 7. Here, processing from step S41 to step S45 of FIG. 7 corresponds to step S24 of FIG. 6. Furthermore, in FIG. 7, the case of performing supervised machine learning as learning, is described as an example.

In step S41, the learning unit 252 receives the manual capturing time which is time when the manual capturing is executed, from the imaging device 10.

In step S42, the learning unit 252 searches the measurement value for n seconds before n seconds of the manual capturing time until the manual capturing time, from the measurement information storage unit 254, and acquires the measurement value.

In step S43, the learning unit 252 performs learning with respect to the information for detecting a trigger operation, on the basis of the measurement value for n seconds. For this reason, the learning unit 252 extracts the data which is the feature amount, from the measurement value for n seconds. For example, a synthetic acceleration rate, a dispersion or a standard deviation of a horizontal/perpendicular acceleration rate, and the like are extracted as the feature amount.

In step S44, the learning unit 252 determines whether or not the learning model is updated by using the feature amount extracted in step S43 as the teacher data in the supervised machine learning. The determination is performed according to whether or not the value of the feature amount is in a certain range, whether or not it is sufficient as an element of the data, or the like, as a standard.

In a case where the learning model is updated, it is determined as Yes in step S45, and the processing proceeds to step S46. On the other hand, in a case where the learning model is not updated, it is determined as No in step S45, and step S24 is ended. Then, step S25 is not performed, the processing returns to step S21, and the processing is repeated.

In step S46, the learning unit 252 updates the learning model. Thus, step S24 is ended. Then, the processing proceeds to step S25. Furthermore, in step S25, the learning model updated in step S24 is stored in the trigger operation detection information storage unit 255, as the information for detecting a trigger operation.

Furthermore, in the above description, it is assumed that the machine learning is performed whenever the teacher data is acquired. Here, in such a case, there are cases where each of various operations is treated as the trigger operation, and the machine learning is not converged. Therefore, the learning unit 252 may determine an upper limit to a certain extent, in the number of teacher data items used in the machine learning. In such a case, the machine learning can be performed by using the teacher data with respect to the recent behavior.

Next, an operation of step S31 of FIG. 6 will be described in more detail, with reference to FIG. 8. Here, processing from step S51 to step S56 of FIG. 8 corresponds to step S31 of FIG. 6.

In step S51, the shutter trigger generating unit 253 reads in the measurement value of the sensor for the last n seconds, from the measurement information storage unit 254.

In step S52, the shutter trigger generating unit 253 extracts the feature amount by analyzing the measurement value of the sensor for the last n seconds. For example, as with step S43, the synthetic acceleration rate, the dispersion or the standard deviation of the horizontal/perpendicular acceleration rate, and the like are extracted as the data for behavior estimation.

In step S53, the shutter trigger generating unit 253 acquires the learning model which is the information for detecting a trigger operation, from the trigger operation detection information storage unit 255.

In step S54, the shutter trigger generating unit 253 performs the behavior estimation with respect to whether or not the trigger operation is detected, on the basis of the feature amount extracted in step S52 and the learning model acquired in step S53. Accordingly, step S31 is ended, and the processing proceeds to step S32.

Figure 7:
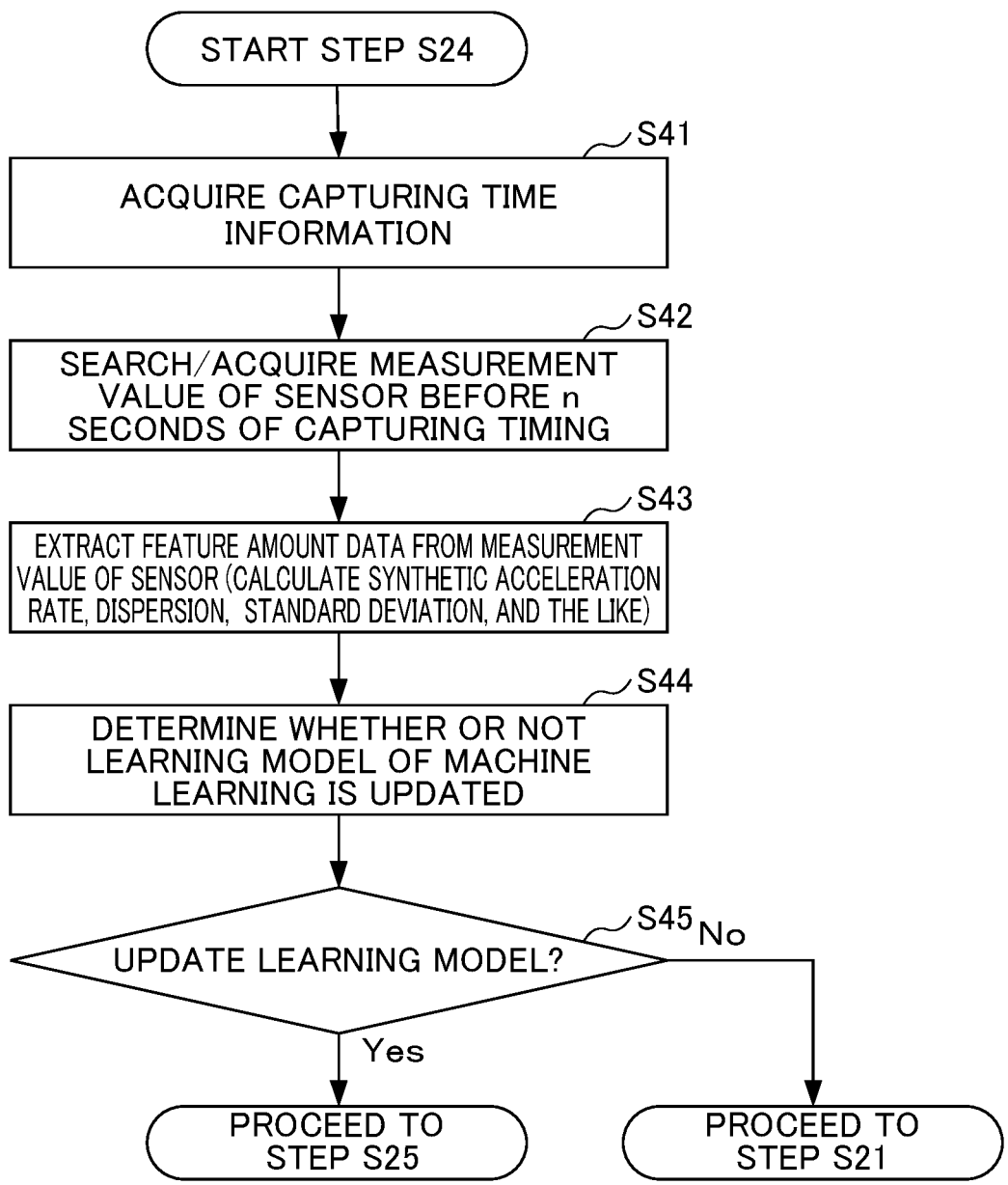
FIG. 7 is a flowchart illustrating an operation at the time of performing the behavior estimation processing of the control apparatus according to the embodiment of the present invention.
Figure 8:
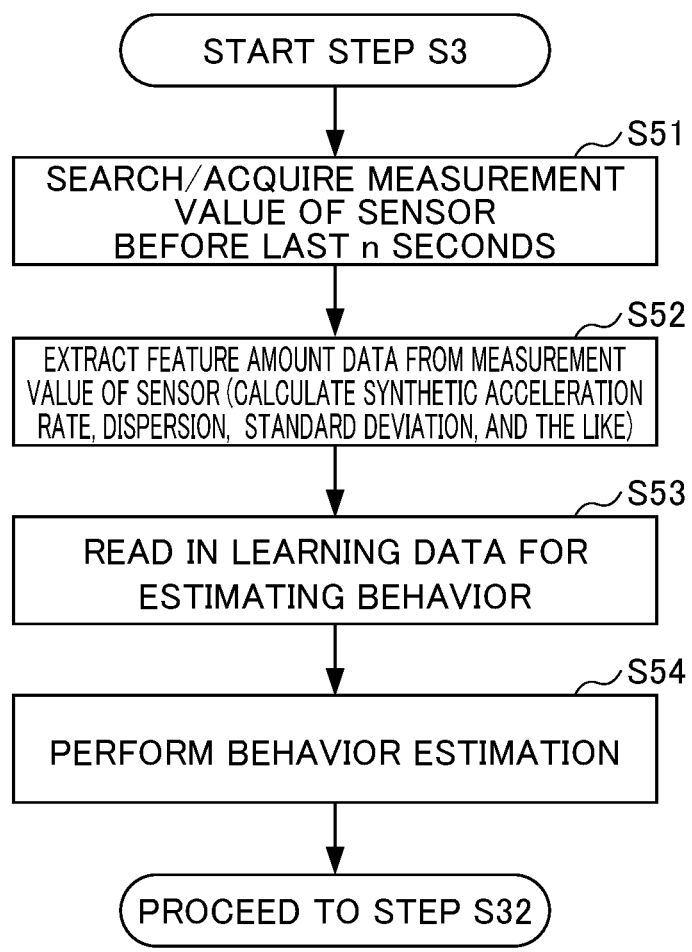
FIG. 8 is a flowchart illustrating an operation at the time of performing the learning processing of the control apparatus according to the embodiment of the present invention.

As described above, according to the processing with reference to FIG. 6, FIG. 7, and FIG. 8, in this embodiment, it is possible to perform the automatic capturing in a condition suitable for the user.

Next, three modified examples of Modified Example 1 to Modified Example 3 will be described, with reference to FIG. 9.

MODIFIED EXAMPLE 1

In the embodiment described above, the automatic capturing system S includes two devices of the imaging device 10 and the control apparatus 20. The functions of both of the imaging device 10 and the control apparatus 20 may be realized in one device, by changing the configuration.

For example, as illustrated in FIG. 9 as <Modified Example 1>, the functions of both of the imaging device 10 and the control apparatus 20 may be realized by a portable terminal 30a including a capturing unit and a display. In addition, as illustrated in FIG. 9 as <Modified Example 1>, the functions of both of the imaging device 10 and the control apparatus 20 may be realized by setting software for realizing a specific function of this embodiment in a portable terminal 30b which is a general-purpose smart phone.

Figure 10:
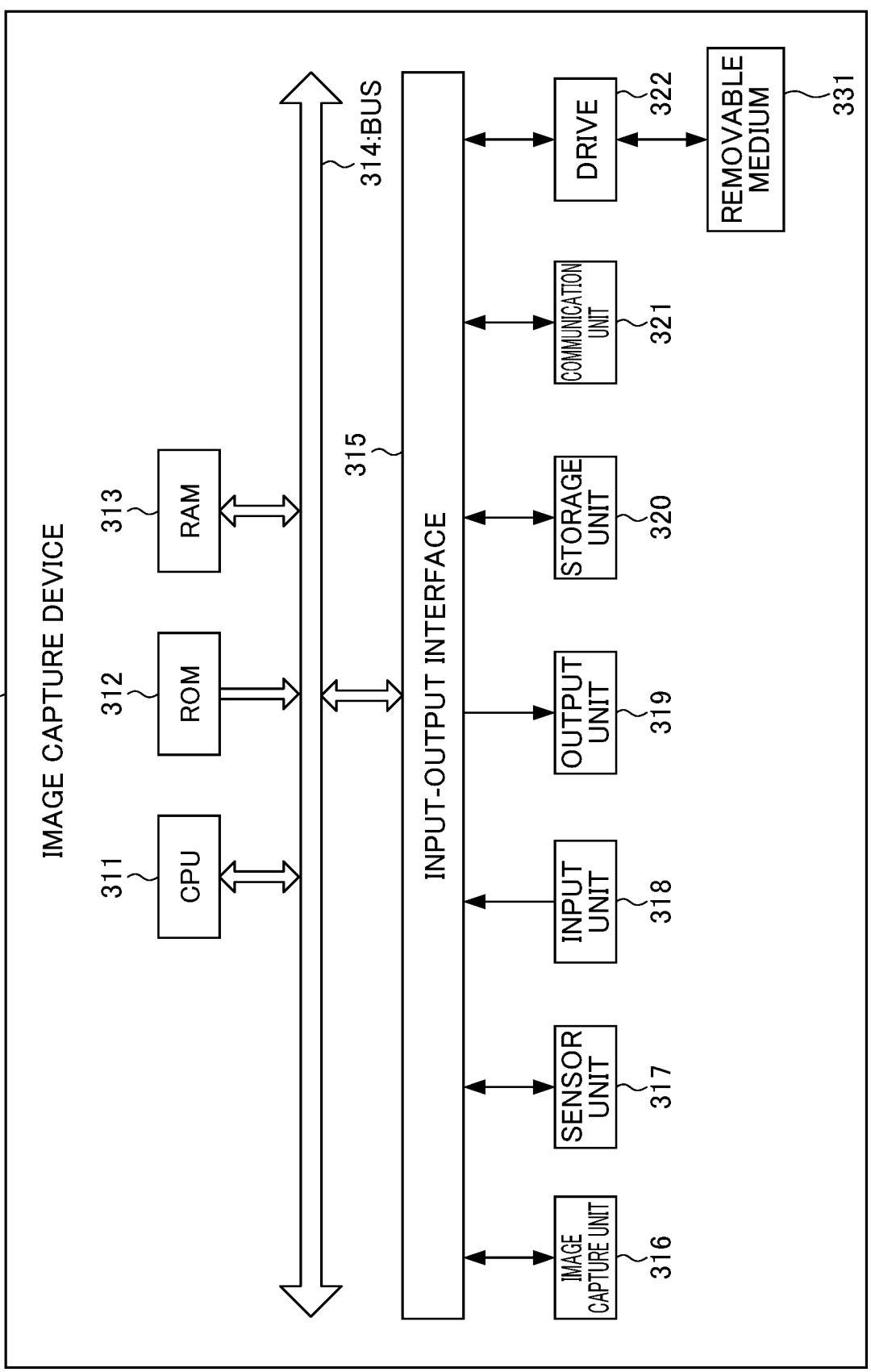
FIG. 10 is a block diagram illustrating a hardware configuration of a portable terminal device according to Modified Example 3 of the embodiment of the present invention.

In this modified example, a hardware configuration of the portable terminal device 30 will be described with reference to FIG. 10. As described above, the portable terminal device 30 is configured as a device having both of the function of the imaging device 10 and the function of the control apparatus 20. As illustrated in FIG. 10, the portable terminal device 30 includes a CPU 311, a ROM 312, a RAM 313, a bus 314, an input-output interface 315, an image capture unit 316, a sensor unit 317, an input unit 318, an output unit 319, a storage unit 320, a communication unit 321, and a drive 322. Such configurations are identical to those of each of the portions with the same names of the imaging device 10 described with reference to FIG. 3 or those of each of the portions with the same names of the control apparatus 20 described with reference to FIG. 4.

According to this modified example, it is possible to realize the automatic capturing system S without performing wireless communication. For example, in the embodiment described above, the shutter trigger generating unit 253 is provided in the control apparatus 20, the shutter trigger generating unit 253 transmits the generated shutter trigger to the imaging device 10, and the imaging device 10 receiving the shutter trigger performs capturing. On the contrary, according to this modified example, in one device such as the portable terminal device 30, the shutter trigger is generated, and capturing based on the generated shutter trigger can be performed. Thus, according to this modified example, in a case where the shutter trigger generating unit is provided in any device, it is possible to arbitrarily select whether or not to perform control for performing capturing by the any device itself or to perform control for performing capturing by a device other than the any device.

MODIFIED EXAMPLE 2

In the embodiment described above, the automatic capturing system S includes two devices of the imaging device 10 and the control apparatus 20. Here, as illustrated in FIG. 9 as <Modified Example 2>, the imaging device 10 may be realized by a camera performing capturing by being held in the hands of the user or performing capturing by being fixed to a tripod stand, but not a camera worn by the user. Accordingly, for example, the user is capable of performing the automatic capturing in a state where a lens direction or the like is adjusted by confirming a finder. In addition, the control apparatus 20 may be realized by a smart watch including a sensor. Accordingly, it is possible to detect the motion of the wrist or the like by the sensor, and thus, it is possible to use the motion of the wrist or the like as the trigger operation.

MODIFIED EXAMPLE 3

In the embodiment described above, the automatic capturing system S includes two devices of the imaging device 10 and the control apparatus 20. Here, as illustrated in FIG. 9 as <Modified Example 3>, a function may be dispersed in a plurality of devices.

For example, a function of receiving the shutter manipulation from the user in the imaging device 10 is realized by a smart phone, and is set as the imaging device 11, and a function of performing capturing in the imaging device 10 is realized by a camera, and is set as the imaging device 12, and thus, the function of the imaging device 10 may be dispersed in two devices. In addition, for example, the function of the control apparatus 20 may be dispersed in two devices of a device including each functional block which is realized by the CPU 211 or the storage unit 219 illustrated in FIG. 5, and a device including the sensor unit 216 illustrated in FIG. 5. Accordingly, it is possible to improve a freedom degree of the configuration of the automatic capturing system S.

MODIFIED EXAMPLE 4

In the embodiment described above, the information for detecting a trigger operation is learned on the basis of the measurement value of the sensor when the manual capturing is performed. In addition, the behavior estimation is performed on the basis of the learned information for detecting a trigger operation and the measurement value of the sensor, and thus, the trigger operation is detected. The image data is subjected to image analysis but not to the measurement of the sensor, by changing the configuration, and thus, the information for detecting a trigger operation may be learned, or the trigger operation may be detected by performing the behavior estimation.

In this case, the user is captured in a moving image or a still image by the imaging device 10, for a predetermined period. Then, the imaged image when the manual capturing is performed is subjected to the image analysis, and thus, the information for detecting a trigger operation is learned. Further, the user is captured in the moving image or the still image for a predetermined period, and the behavior estimation is performed on the basis of the information obtained by performing the image analysis with respect to the imaged image, and the information for detecting a trigger operation, and thus, the trigger operation is detected. Furthermore, the moving image or the still image which is periodically captured for the processing, is unnecessary data after being subjected to the image analysis and being set as a processing target, and thus, is sequentially deleted. Accordingly, this embodiment can also be applied to a circumstance where it is difficult to obtain the measurement value of the sensor.

MODIFIED EXAMPLE 5

In the embodiment described above, learning is performed on the basis of the measurement value of the sensor when the manual capturing is performed, and thus, the information for detecting a trigger operation is learned. In this case, information for detecting a trigger operation, which is a standard, may be prepared in advance. Then, learning is performed on the basis of the measurement value of the sensor when the manual capturing is performed, and thus, the information for detecting a trigger operation, which is a standard, may be corrected.

Accordingly, there is a possibility that it is possible to increase an accuracy of the information for detecting a trigger operation early, compared to a case where the information for detecting a trigger operation is generated from a circumstance in which nothing exists. In addition, even in a case where the information for detecting a trigger operation it is a standard, is the same, the information for detecting a trigger operation suitable for each user is corrected by the subsequent correction, and thus, the trigger operation suitable for each of the users can be detected.

[Example of Usage Circumstance]

This embodiment described above can be used in various circumstances. For example, a case is considered in which in a case where the user who is climbing, looks backward, a companion who is behind, is captured as a subject. In this case, the user manually performs the shutter manipulation at the time of looking backward. Then, learning of the learning unit 252 is performed, and the information for detecting a trigger operation is recorded on the basis of measurement data obtained by measuring a motion when the user looks backward (that is, the trigger operation). After that, the automatic capturing is performed according to the behavior estimation based on the information for detecting a trigger operation, whenever the user looks backward. Accordingly, the user is capable of capturing the companion who is behind, as a subject, without performing the shutter manipulation.

Here, the trigger operation may be unconsciously performed by the user, or may be intentionally performed by the user. For example, a characteristic motion such as shaking of a right hand or a left hand of the user, is intentionally performed as the trigger operation, and the characteristic motion may be remembered in the control apparatus 20.

For example, a case is considered in which the user who is climbing, captures a background, as an example of intentionally remembering the characteristic motion. In this case, the user pauses and intentionally performs the characteristic motion, and manually performs the shutter manipulation. Then, learning of the learning unit 252 is performed, and the information for detecting a trigger operation is recorded on the basis of measurement data obtained by measuring a motion when the user pauses and intentionally performs the characteristic motion (that is, the trigger operation). After that, the automatic capturing is performed according to the behavior estimation based on the information for detecting a trigger operation, whenever the user pauses and intentionally performs the characteristic motion. Accordingly, the user is capable of performing capturing in an arbitrary place without performing the shutter manipulation.

For example, the imaging device 10 and the control apparatus 20 may be used by a separate user, as another example. For example, the control apparatus 20 is worn by the user who is a subject, and the imaging device 10 is retained by the user who is a photographer. Then, in a case where the user who is a subject, performs a predetermined motion (for example, a jump), the user who is a photographer, manually performs the shutter manipulation in order to capture the user who is a subject. Then, learning of the learning unit 252 is performed, and the information for detecting a trigger operation is recorded on the basis of measurement data obtained by measuring a motion when the user who is a subject, jumps (that is, the trigger operation). After that, the automatic capturing is performed according to the behavior estimation based on the information for detecting a trigger operation, whenever the user who is a subject, jumps.

For example, a case is considered in which a group photograph is captured, as another example. In this case, the user who is a photographer, intentionally performs a predetermined motion (for example, beckoning) and manually performs the shutter manipulation, with respect to the user who is a subject. Then, learning of the learning unit 252 is performed, and the information for detecting a trigger operation is recorded on the basis of measurement data obtained by measuring a motion when the user who is a subject, beckons (that is, the trigger operation). After that, the automatic capturing is performed according to the behavior estimation based on the information for detecting a trigger operation, whenever beckoning is intentionally performed with respect to the user who is subject. In this case, the imaging device 10 is fixed to a tripod stand or the like, and the user who is a photographer, may be a subject.

In addition, the trigger operation may be performed by a moving body such as an animal or a device, but not by a person. For example, the control apparatus 20 is worn by a pet or the like, and automatic capturing of capturing the pet or the like on the basis of a trigger operation of the pet or the like may be performed. Further, for example, the control apparatus 20 is mounted on a blocking rod of a railroad crossing, and automatic capturing of capturing a passing train may be performed by using an opening and closing operation of the blocking rod as the trigger operation. In addition, for example, a functional block corresponding to the sensor unit 216 of the control apparatus 20 is mounted on a floating portion of a fishing pole, and a motion of the floating portion of the fishing pole at the time of landing a fish may be set as the trigger operation. Accordingly, it is possible to set a state of landing a fish as a target of the automatic capturing. In this case, the imaging device 10 may be provided in a position where the landed fish is captured, or may be provided in a position where the user who lands a fish, is captured.

In addition, the automatic capturing may be performed in a circumstance where a sport is performed. For example, the automatic capturing may be performed in the imaging device 10 which is worn by the user, by using the motion of the user who snowboards or surfs, as the trigger operation. Alternatively, the automatic capturing may be performed by using the motion of the user who snowboards or surfs, as the trigger operation, and by using the user as a subject. In this case, the imaging device 10 may be provided in a position where the user can be captured. In addition, the manual capturing at the time of being remembered in the control apparatus 20, may be performed by a user other than the user described above, by using the motion of the user who snowboards or surfs, as the trigger operation.

Furthermore, in a case where the automatic capturing is performed in the circumstance described above, a modified example according to a circumstance, which is the modified example illustrated in FIG. 9, may be used. In addition, the embodiment described above may be used in a circumstance other than the exemplified circumstance.

[Relationship of Photographer, Subject, and Trigger Body]

As exemplified in the modified example described above, in this embodiment, the "photographer" performing the manual capturing by using the imaging device 10, the "subject" which is the capturing target of the manual capturing or the automatic capturing of the imaging device 10, and the "trigger body" performing the trigger operation, which is a detection target of the control apparatus 20, may be the same, or may be different from each other. For example, all of the photographer, the subject, and the trigger body may be the same. In addition, the photographer may be different from the subject and the trigger body. In addition, the photographer and the subject may be different from the trigger body. In addition, the photographer and the trigger body may be different from the subject. In addition, all of the photographer, the subject, and the trigger body may be different from each other.

Further, in this embodiment, as with the case of using a general imaging device, a target which is a photographer or a subject, is not particularly limited. In addition, a target which is a trigger body, is also not particularly limited. In the embodiment described above, a case where the user who is a human being, is set as the trigger body, has been described as an example, but a body which can be a measurement target of a trigger operation of an animal, a device, a natural phenomenon, or the like other than the human being, can be set as the trigger body.

MODIFIED EXAMPLE 6

In the embodiment described above, the automatic capturing is performed in real time by using the detection of the "trigger operation" of the trigger body such as the user, as an opportunity, and thus, the image data is acquired. In this modified example, the configuration described above is modified. Specifically, the configuration is modified such that the capturing of the trigger body (the trigger) is used as an opportunity, the detection of the trigger operation is used as an opportunity instead. In addition, the configuration is modified such that in a case where an opportunity occurs, image data which was captured in the past is acquired by constant capturing, image data is acquired by performing the automatic capturing in real time instead. Here, in this modified example, it is not necessary to detect the operation of the trigger body, and thus, for example, a background or the like (the trigger) which is not a target of which the operation is detected, can be treated as the trigger body.

A functional configuration of the imaging device 10 for realizing processing after such a modification will be described with reference to FIG. 11. Furthermore, in this modification, it is not necessary to detect the trigger operation by the control apparatus 20, and thus, it is possible to realize this modification by only the imaging device 10.

Figure 11:
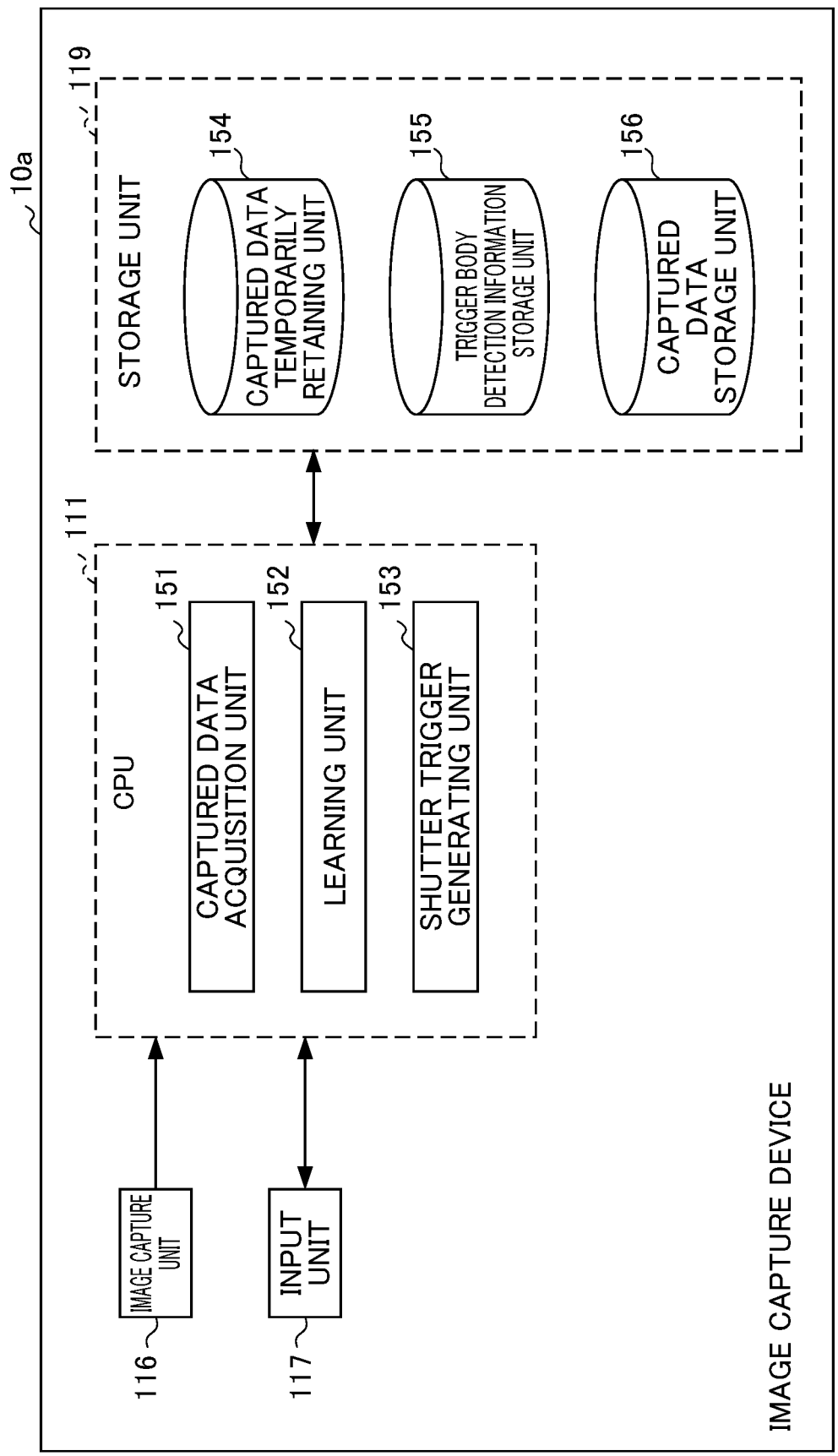
FIG. 11 is a functional block diagram illustrating a functional configuration for executing behavior estimation processing and learning processing in a functional configuration of an imaging device according to Modified Example 6 of the embodiment of the present invention.

In this modification, in a case where the learning processing and the behavior estimation processing are executed, as illustrated in FIG. 11, in the CPU 211, a image data acquisition unit 151, a learning unit 152, and a storage trigger generating unit 153, function. In addition, a image data temporarily retaining unit 154, a trigger body detection information storage unit 155, and a image data storage unit 156 are set in one region of the storage unit 219.

The image data acquisition unit 151 is a portion acquiring the imaging data captured by the image capture unit 116. In this modification, the image capture unit 116 performs the constant capturing. Then, the image data which is generated according to the capturing of the image capture unit 116 is sequentially acquired by the image data acquisition unit 151. The image data acquisition unit 151 retains the acquired image data in the image data temporarily retaining unit 154.

The image data temporarily retaining unit 154 is a portion temporarily retaining the image data. The image data temporarily retaining unit 154 has predetermined storage capac-ity. Then, when the newly image data is retained in the image data temporarily retaining unit 154, the image data acquisition unit 151 sequentially deletes the image data which exceeds the predetermined storage capacity, from the oldest image data. Accordingly, the image data temporarily retaining unit 154 is in a state where the image data captured in the last predetermined period is constantly retained. Furthermore, the length of the last predetermined period is determined according to the size of the storage capacity of the image data temporarily retaining unit 154 and the size of the image data which is determined by the resolution or the like of the image data.

The learning unit 152 is a portion performing learning with respect to information for detecting a trigger body, on the basis of the imaging data captured by the image capture unit 116. Specifically, in a case where it is detected that the shutter button for the user to perform the manual capturing is pressed, the learning unit 152 acquires time at the time of performing the detection, as manual capturing time which is time when the manual capturing is executed. Furthermore, the shutter button is realized by the input unit 117. Here, in this modified example, the image data captured in the last predetermined period is constantly retained in the image data temporarily retaining unit 154. Therefore, in this modified example, as with the embodiment described above, in a case where the user presses the shutter button, recording the image data imaged by the image capture unit 116 in the image data storage unit 156 may be treated as the manual capturing, or selecting the imaging data by the user may be treated as the manual capturing. That is, recording the image data which is selected from the image data in the image data storage unit 156 by the user with reference to the image data which is retained in the image data temporarily retaining unit 154 by the user, may be treated as the manual capturing. Furthermore, such a manipulation of the user corresponds to a "manual image acquisition operation with respect to a storage unit of the user" of the present invention.

Next, the learning unit 152 acquires the image data captured at the manual capturing time, from the image data temporarily retaining unit 154. Then, the learning unit 152 specifies a subject which is captured in the image data by analyzing the acquired image data. An analyzing method may be a known method, and for example, the subject captured in the image data is specified by a method of pattern matching based on RGB values or a luminance value of the imaging data, or of extracting a contour point or a characteristic point according to the image processing. The specifying, for example, may be performed in large categories such as a "person", an "animal", a "plant", and a "landscape", or may be performed in narrow categories. For example, an individual who is a subject, may be specified by using a facial recognition technology. In addition, for example, the type of animal or the type of plant may be specified. In addition, for example, it may be specified whether an image is simply captured in a bright place or is captured in a dark place.

The learning unit 152 stores information indicating the specified subject in the trigger body detection information storage unit 155, as the information for detecting a trigger body. Furthermore, in this modification, learning is performed by repeating the specifying described above, and an accuracy of the information for detecting a trigger body may increase.

The storage trigger generating unit 153 determines from which image data the trigger body is detected, on the basis of each image data item retained in the image data temporarily retaining unit 154 and the information for detecting a trigger body stored in the trigger body detection information storage unit 155.

Then, as a result of the determination, the storage trigger generating unit 153 acquires the image data detected by the trigger body from the image data temporarily retaining unit 154 by using the detection of the trigger body from the image data as a trigger (an opportunity), and stores the acquired image data in the image data storage unit 156.

Accordingly, in this modification, in a case where the trigger body which is captured by the user according to the manual capturing, is also captured according to the constant capturing, it is possible to store the image data in which the trigger body is captured. For example, in a case where the user captures a certain type of flower, it is possible to automatically record and to accumulate the image data of the certain type of flower without requiring the shutter manipulation of the user.

That is, in this modification, it is possible to perform the automatic capturing in a condition suitable for the user. Furthermore, the measurement data in the embodiment described above, or the image data which is acquired by the constant capturing in this modification, corresponds to "observation information" of the present invention. As described above, a plurality of modified examples have been described, but the configurations of the embodiment described above or each of the modified examples may be suitably combined.

The control apparatus 20 (the imaging device 10) configured as described above, includes the measurement information acquisition unit 251 (the input unit 117), the measurement information acquisition unit 251 (the image data acquisition unit 151), the learning unit 252 (the learning unit 152), and the shutter trigger generating unit 253 (the storage trigger generating unit 153). The measurement information acquisition unit 251 (the input unit 117) detects the manual image acquisition operation with respect to the storage unit of the user. The measurement information acquisition unit 251 (the image data acquisition unit 151) acquires the observation information relevant to the trigger for automatically acquiring the image data, on the basis of the detection of the manual image acquisition operation. The learning unit 252 (the learning unit 152) sets the threshold value for automatically acquiring the image data, on the basis of the observation information acquired by detecting the manual image acquisition operation. The shutter trigger generating unit 253 (the storage trigger generating unit 153) performs control for automatically acquiring the image data, on the basis of the threshold value of the observation information. Accordingly, it is possible to acquire the imaging with a high accuracy, on the basis of the observation information.

The control apparatus 20 (the imaging device 10) or a device other than the control apparatus 20 (the imaging device 10) automatically acquires the image data, on the basis of the control for automatically acquiring the image data of the shutter trigger generating unit 253 (the storage trigger generating unit 153). Accordingly, it is possible to automatically acquire the imaging data on the basis of the observation information.

The shutter trigger generating unit 253 (the storage trigger generating unit 153) performs control for automatically acquiring the image data according to a comparison result between the observation information acquired when the manual image acquisition operation is not performed and the threshold value. Accordingly, in the case of performing the same operation as that when the user detects the imaging data acquiring manipulation, the imaging data can be acquired.

The measurement information acquisition unit 251 (the image data acquisition unit 151) acquires the measurement result of the motion sensor measuring the motion of the trigger as the observation information, and the shutter trigger generating unit 253 (the storage trigger generating unit 153) specifies the motion of the trigger on the basis of the measurement result of the motion sensor, and performs control for automatically acquiring the image data on the basis of the specified motion of the trigger. Accordingly, the imaging data can be acquired on the basis of an estimation result of the motion sensor.

The measurement information acquisition unit 251 (the image data acquisition unit 151) acquires the image data which is captured by the image capture unit 116, as the observation information, and the shutter trigger generating unit 253 (the storage trigger generating unit 153) specifies the motion of the trigger by analyzing the image data which is captured by the image capture unit 116, and performs control for automatically acquiring the image data on the basis of the specified motion of the trigger. Accordingly, the imaging data can be acquired on the basis of an analysis result of the imaging data.

The measurement information acquisition unit 251 (the image data acquisition unit 151) acquires the image data which is captured by the image capture unit 116, as the observation information, and the shutter trigger generating unit 253 (the storage trigger generating unit 153) determines whether or not the trigger is captured by analyzing the image data which is captured by the image capture unit 116, and performs control for automatically acquiring the image data on the basis of a determination result. Accordingly, the imaging data can be acquired on the basis of whether or not the trigger body is captured.

The learning unit 252 (the learning unit 152) accumulates the observation information when the shutter manipulation of the user is detected, and learns the threshold value which is set by using the accumulated observation information. Accordingly, it is possible to acquire the imaging data with a high accuracy, by using a learning result.

The learning unit 252 (the learning unit 152) specifies a pattern corresponding to the observation information acquired by detecting the shutter manipulation, on the basis of the accumulated observation information, and performs learning on the basis of a characteristic pattern in the specified patterns. Accordingly, it is possible to acquire the imaging data with a higher accuracy without using data of a non-characteristic motion pattern.

The learning unit 252 (the learning unit 152) stores standard information which is a standard of the observation information, and performs learning by correcting the standard information on the basis of the observation information which is acquired by the measurement information acquisition unit 251 (the image data acquisition unit 151), and in a case where there are a plurality of triggers, the learning is performed with respect to each of the triggers. Accordingly, it is possible to perform learning suitable for a separate user.

The trigger body is the user. Accordingly, it is possible to perform learning suitable for the user who performs the shutter manipulation.

The image capture unit 116 is realized by a separate device from the control apparatus 20 (the imaging device 10), and the shutter trigger generating unit 253 (the storage trigger generating unit 153) performs control for automatically acquiring the image data by performing communication with respect to the image capture unit 116 which is realized by the separate device. Accordingly, the control apparatus 20 can be realized by a device not including the capturing unit.

The shutter trigger generating unit 253 (the storage trigger generating unit 153) acquires the image data by automatically controlling the shutter manipulation of the image capture unit 116. Accordingly, it is possible to newly acquire the newly image data.

The image data temporarily retaining unit 154 temporarily retaining the image data which is acquired by the image capture unit 116 is further provided, and the shutter trigger generating unit 253 (the storage trigger generating unit 153) acquires the image data which is retained in the image data temporarily retaining unit 154 according to the automatic control. Accordingly, it is possible to acquire the image data which is temporarily retained.

Furthermore, the present invention is not limited to the embodiment described above, and modifications, improvements, and the like within a range where the object of the present invention can be attained, are included in the present invention.

Furthermore, in this embodiment, the observation information relevant to the trigger body is the observation information extracted from the image data (for example, information relevant to the motion of the subject, RGB information of the image, or information relevant to the luminance value). However, the observation information relevant to the trigger body is not limited to the observation information extracted from the image data, and may be the image data.

The processing sequence described above can be executed by hardware, and can also be executed by software. In other words, the functional configuration of FIG. 5 is merely illustrative examples, and the present invention is not particularly limited thereto. More specifically, the types of functional blocks employed to realize the above-described functions are not particularly limited to the examples shown in FIG. 2, so long as the automatic capturing system S can be provided with the functions enabling the aforementioned processing sequence to be executed in its entirety. A single functional block may be constituted by a single piece of hardware, a single installation of software, or a combination thereof. The functional configurations of the present embodiment are realized by a processor executing arithmetic processing, and processors that can be used for the present embodiment include a unit configured by a single unit of a variety of single processing devices such as a single processor, multi-processor, multi-core processor, etc., and a unit in which the variety of processing devices are combined with a processing circuit such as ASIC (Application Specific Integrated Circuit) or FPGA (Field-Programmable Gate Array).

In the case of having the series of processing executed by software, the program constituting this software is installed from a network or recording medium to a computer or the like. The computer may be a computer equipped with dedicated hardware. In addition, the computer may be a computer capable of executing various functions, e.g., a general purpose personal computer, by installing various programs.

The storage medium containing such a program can not only be constituted by the removable medium distributed separately from the device main body for supplying the program to a user, but also can be constituted by a storage medium or the like supplied to the user in a state incorporated in the device main body in advance. The removable medium 231, 331 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), Blu-ray (Registered Trademark) or the like. The magnetic optical disk is composed of an MD (Mini-Disk) or the like. The storage medium supplied to the user in a state incorporated in the device main body in advance is constituted by, for example, the ROM 112, 212, 312 in which the program is recorded, and a hard disk included in the storage unit 119, 219, 320, and the like.

It should be noted that, in the present specification, the steps defining the program recorded in the storage medium include not only the processing executed in a time series following this order, but also processing executed in parallel or individually, which is not necessarily executed in a time series. Further, in this specification, the term of the system shall mean an entire apparatus composed of a plurality of apparatuses, a plurality of means, and the like.

The embodiments of the present invention described above are only illustrative, and are not to limit the technical scope of the present invention. The present invention can assume various other embodiments. Additionally, it is possible to make various modifications thereto such as omissions or replacements within a scope not departing from the spirit of the present invention. These embodiments or modifications thereof are within the scope and the spirit of the invention described in the present specification, and within the scope of the invention recited in the claims and equivalents thereof.

What is claimed is:

1. An image capture control apparatus comprising:
a processor;
a memory; and
a camera
wherein the processor executes a program stored in the memory to perform operations comprising:
detecting a manual image acquisition operation in which a user instructs the image capture control apparatus to capture or record an image to a storage unit according to an instruction;
acquiring observation information relevant to a trigger for automatically acquiring image data on the basis of the detection of the manual image acquisition operation;
setting a threshold value for automatically acquiring the image data on the basis of the observation information acquired by detecting the manual image acquisition operation; and
performing control for automatically acquiring the image data on the basis of the threshold value of the observation information,
wherein acquiring the observation information further comprises acquiring image data which is captured by the camera as the observation information, and
performing control for automatically acquiring the image data further comprises specifying the motion of the trigger by analyzing image data which is captured by the camera to perform control for automatically acquiring the image data on the basis of the specified motion of the trigger.

2. The image capture control apparatus according to claim 1, wherein the processor is further configured to:
allow the image capture control apparatus or a device other than the image capture control apparatus to automatically acquire the image data on the basis of the control of the image capture control apparatus.

3. The image capture control apparatus according to claim 1, wherein the processor is further configured to:
perform control for automatically acquiring the image data according to a comparison result between the observation information acquired when the manual image acquisition operation is not performed, and the threshold value.

4. The image capture control apparatus according to claim 1, wherein acquiring the observation information further comprises acquiring a measurement result of a motion sensor measuring a motion of the trigger as the observation information, and
performing control for automatically acquiring the image data further comprises specifying the motion of the trigger on the basis of the measurement result of the motion sensor, to perform control for automatically acquiring the image data on the basis of the specified motion of the trigger.

5. The image capture control apparatus according to claim 1, wherein performing control for automatically acquiring the image data further comprises determining whether or not the trigger is captured by analyzing image data which is captured by the camera, to perform control for automatically acquiring the image data on the basis of a determination result.

6. The image capture control apparatus according to claim 1, wherein setting the threshold value further comprises accumulating the observation information acquired by detecting a shutter manipulation according to a user, to perform learning with respect to the threshold value which is set by using the accumulated observation information.

7. The image capture control apparatus according to claim 6, wherein setting the threshold value further comprises specifying a pattern corresponding to the observation information acquired by detecting the shutter manipulation on the basis of the accumulated observation information, to perform learning on the basis of a characteristic pattern in the specified patterns.

8. The image capture control apparatus according to claim 6, wherein the memory stores standard information which is a standard of the observation information,
wherein setting the threshold value further comprises performing learning by correcting the standard information on the basis of the acquired observation information, and
wherein in a case where there are a plurality of triggers, learning is performed with respect to each of the triggers.

9. The image capture control apparatus according to claim 7, wherein the memory stores standard information which is a standard of the observation information,
wherein setting the threshold value further comprises performing learning by correcting the standard information on the basis of the acquired observation information, and
wherein in a case where there are a plurality of triggers, learning is performed with respect to each of the triggers.

10. The image capture control apparatus according to claim 1, wherein the trigger is a user.

11. The image capture control apparatus according to claim 1, further comprising:
a camera,
wherein the camera is realized by a separate device from the image capture control apparatus, and
wherein the processor is further configured to, perform control for automatically acquiring the image data by performing communication with respect to the camera which is realized by the separate device.

12. The image capture control apparatus according to claim 1, wherein the processor is further configured to, acquire the image data by automatically controlling a shutter manipulation of the camera.

13. The image capture control apparatus according to claim 1, further comprising:
a temporary memory for temporarily retaining image data which is captured by the camera,
wherein the processor is further configured to acquire the image data which is retained in the temporary memory according to automatic control.

14. An image capture control method executed by an image capture control apparatus including a processor, the image capture control method causing the processor to execute a program stored in a memory to perform operations comprising:
detecting a manual image acquisition operation in which a user instructs the image capture control apparatus to capture or record an image to a storage unit according to an instruction;
acquiring observation information relevant to a trigger for automatically acquiring image data on the basis of the detection of the manual image acquisition operation;
setting a threshold value for automatically acquiring the image data on the basis of the observation information acquired by detecting the manual image acquisition operation; and
performing control for automatically acquiring the image data on the basis of the threshold value of the observation information,
wherein acquiring the observation information further comprises acquiring image data which is captured by the camera as the observation information, and
performing control for automatically acquiring the image data further comprises specifying the motion of the trigger by analyzing image data which is captured by the camera to perform control for automatically acquiring the image data on the basis of the specified motion of the trigger.

15. A non-transitory computer-readable storage medium storing a program that is executable by a computer that comprises a processor to control an image capture control apparatus, the program being executable to cause the computer to perform operations comprising:
detecting a manual image acquisition operation in which a user instructs the image capture control apparatus to capture or record an image to a storage unit according to an instruction;
acquiring observation information relevant to a trigger for automatically acquiring image data on the basis of the detection of the manual image acquisition operation;
setting a threshold value for automatically acquiring the image data on the basis of the observation information acquired by detecting the manual image acquisition operation; and
performing control for automatically acquiring the image data on the basis of the threshold value of the observation information,
wherein acquiring the observation information further comprises acquiring image data which is captured by the camera as the observation information, and
performing control for automatically acquiring the image data further comprises specifying the motion of the trigger by analyzing image data which is captured by the camera to perform control for automatically acquiring the image data on the basis of the specified motion of the trigger.

\* \* \* \* \*